(12) United States Patent
Gao et al.

(10) Patent No.: US 12,743,815 B2
(45) Date of Patent: Sep. 22, 2026

(54) ON COMPRESSION OF A MESH WITH MULTIPLE TEXTURE MAPS

(71) Applicant: TENCENT AMERICA LLC, Palo Alto, CA (US)

(72) Inventors: Wen Gao, West Windsor, NJ (US); Jun Tian, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 112 days.

(21) Appl. No.: 18/813,849

(22) Filed: Aug. 23, 2024

(65) Prior Publication Data

US 2025/0069275 A1 Feb. 27, 2025

Related U.S. Application Data

(60) Provisional application No. 63/534,543, filed on Aug. 24, 2023.

(51) Int. Cl.
*G06T 9/00* (2006.01)
*G06T 15/04* (2011.01)

(52) U.S. Cl.
CPC .............. *G06T 9/001* (2013.01); *G06T 15/04* (2013.01)

(58) Field of Classification Search
CPC ................................ G06T 9/001; G06T 15/04
USPC .......................................................... 345/423
See application file for complete search history.

(56) References Cited

U.S. PATENT DOCUMENTS

2024/0153147 A1* 5/2024 Graziosi .............. H04N 19/597
2024/0153150 A1* 5/2024 Kim ..................... H04N 19/597
2024/0233192 A1* 7/2024 Cao ......................... G06T 9/001

OTHER PUBLICATIONS

WG 7, MPEG 3D Graphics and Haptics Coding, "V-Mesh Test Model v1", International Organization for Standardization Organisation Internationale De Normalisation ISO/IEC JTC 1/SC 29/WG 7 MPEG 3D Graphics and Haptics Coding, ISO/IEC JTC 1/SC 29/WG 7 N00404, Jul. 2022, Virtual (3 pages total).

WG 2, MPEG Technical requirements, "CfP for Dynamic Mesh Coding", International Organization for Standardization Organisation Internationale De Normalisation ISO/IEC JTC 1/SC 29/WG 2 MPEG Technical Requirements, ISO/IEC JTC 1/SC 29/WG 2, N145, Oct. 2021, Virtual (39 pages total).

(Continued)

*Primary Examiner* — Jin Ge
(74) *Attorney, Agent, or Firm* — Sughrue Mion, PLLC

(57) ABSTRACT

A method and apparatus comprising computer code for mesh coding configured to cause a processor or processors to receive an input dynamic mesh representing a volumetric data of at least one three-dimensional (3D) visual content, wherein the input dynamic mesh comprises a plurality of mesh frames; determine that a mesh frame among the plurality of mesh frames comprises a plurality of texture maps in response to a mesh file associated with the mesh frame indicating that at least two different materials are applied in the mesh frame; determine a material index associated with each triangle face in the mesh frame, wherein a respective material index indicates a texture to be applied to a respective triangle face; and encode material indices associated with the mesh frame of the input dynamic mesh.

18 Claims, 9 Drawing Sheets

(56) References Cited

OTHER PUBLICATIONS

Khaled Mammou, et al., "[V-CG] Apple's Dynamic Mesh Coding CfP Response", Apple Inc., International Organisation for Standardisation Organisation Internationale De Normalisation ISO/IEC JTC 1/SC 29/WG 7 Coding of Moving Pictures and Audio, ISO/IEC JTC 1/SC 29/WG 7, m59281, Online—Apr. 2022 (24 pages total).

* cited by examiner

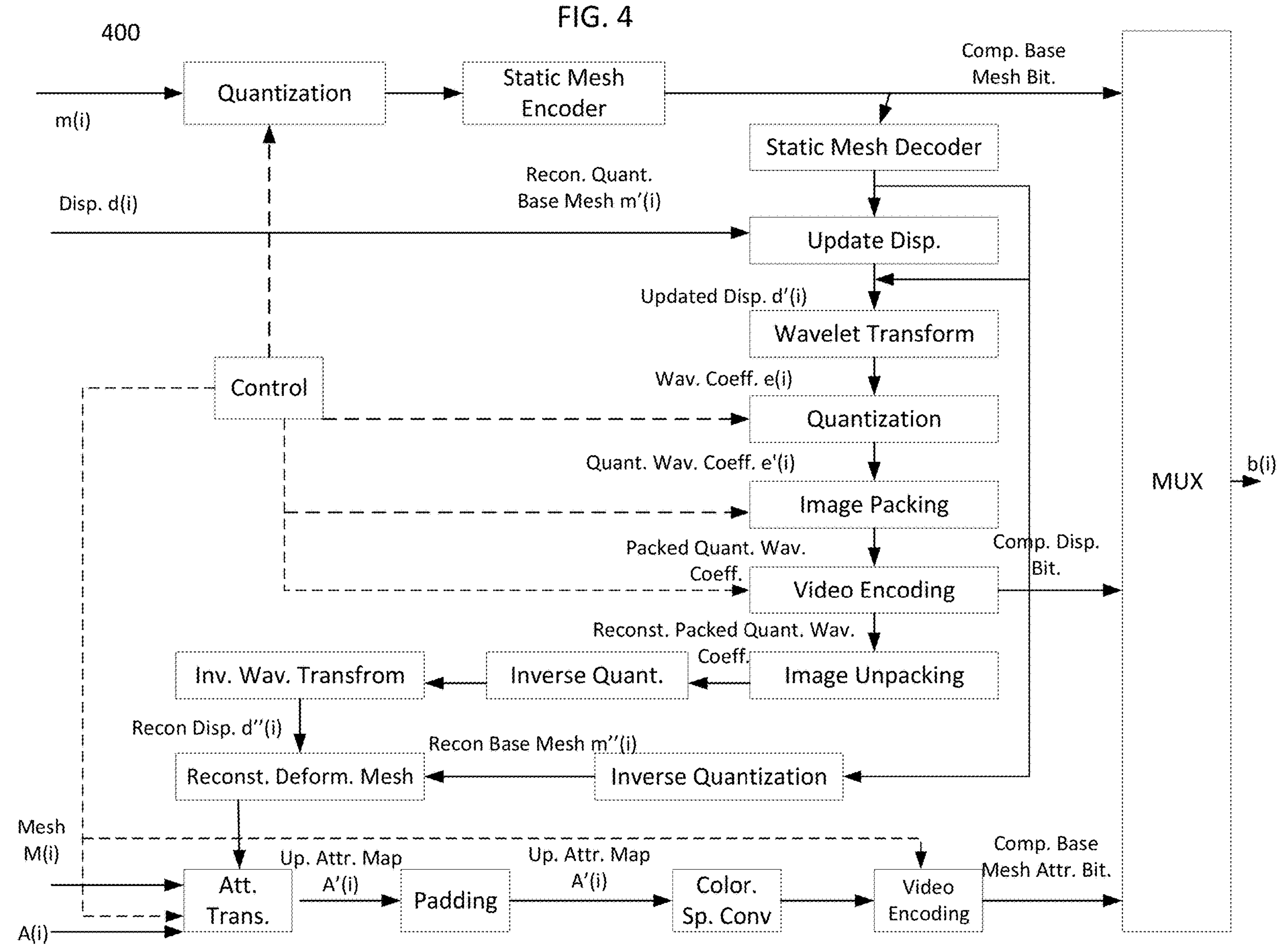
FIG. 4
400
m(i)
Quantization
Static Mesh Encoder
Comp. Base Mesh Bit.
Static Mesh Decoder
Disp. d(i)
Recon. Quant. Base Mesh m'(i)
Update Disp.
Updated Disp. d'(i)
Wavelet Transform
Control
Wav. Coeff. e(i)
Quantization
Quant. Wav. Coeff. e'(i)
Image Packing
Packed Quant. Wav. Coeff.
Video Encoding
Comp. Disp. Bit.
MUX
b(i)
Reconst. Packed Quant. Wav. Coeff.
Inv. Wav. Transfrom
Inverse Quant.
Image Unpacking
Recon Disp. d''(i)
Recon Base Mesh m''(i)
Reconst. Deform. Mesh
Inverse Quantization
Mesh M(i)
A(i)
Att. Trans.
Up. Attr. Map A'(i)
Padding
Up. Attr. Map A'(i)
Color. Sp. Conv
Video Encoding
Comp. Base Mesh Attr. Bit.

```
mtllib model.mtl
v 0.214531 7.033866 -4.353942
v 0.212856 7.032639 -4.354495
v -0.515368 6.868131 -4.564032
v -0.515422 6.869374 -4.563558
...
vt 0.933417 0.652122
vt 0.933417 0.652122
vt 0.933417 0.652122
vt 0.970218 0.600051
vt 0.970218 0.600051
vt 0.970218 0.600051
...
usemtl model1
f 14/7 12/8 13/9
f 13/9 12/8 14/7
f 17/10 15/11 16/12
f 17/10 16/12 15/11
...
usemtl model2
f 83196/13 50472/14 8108/15
f 63553/16 44135/17 85341/18
f 22696/47 2554/48 33532/49
f 10013/59 27115/60 25917/61
f 75912/131 783/132 46321/133
...
```

FIG. 6
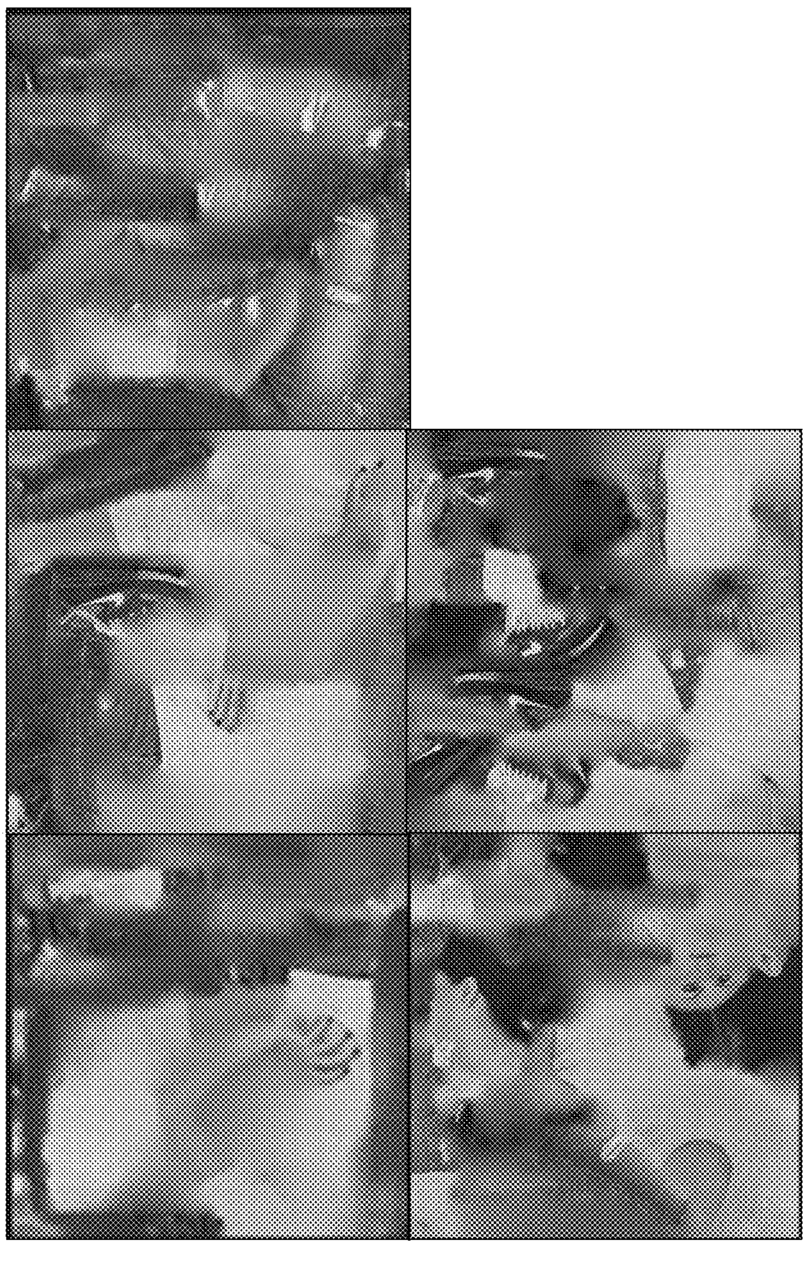
600

ON COMPRESSION OF A MESH WITH MULTIPLE TEXTURE MAPS

CROSS REFERENCE TO RELATED APPLICATION

The present application claims priority to U.S. Provisional Application No. 63/534,543, filed on Aug. 24, 2023, the disclosure of which is incorporated herein in its entirety.

FIELD

Embodiments of this disclosure are directed to video coding and decoding. Specifically, embodiments of the present disclosure are to encoding and decoding multiple sub-meshes including coding valences of mesh vertices in motion vector coding.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may include several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

As another example, glTF (GL Transmission Format) is standard being developed from the Khronos Group for the efficient transmission and loading of 3D scenes and models by applications. glTF aims to minimize both the size of 3D assets, and the runtime processing needed to unpack. A geometry compression extension to glTF 2.0 using Google Draco technology is being developed to reduce the size of glTF models and scenes.

SUMMARY

According to an embodiment, a method for compression of mesh sequences with multiple texture maps per frame is provided. The method may include receiving an input dynamic mesh representing a volumetric data of at least one three-dimensional (3D) visual content, wherein the input dynamic mesh comprises a plurality of mesh frames; determining that a mesh frame among the plurality of mesh frames comprises a plurality of texture maps in response to a mesh file associated with the mesh frame indicating that at least two different materials are applied in the mesh frame; determining a material index associated with each triangle face in the mesh frame, wherein a respective material index indicates a texture to be applied to a respective triangle face; and encoding material indices associated with the mesh frame of the input dynamic mesh.

According to an embodiment, an apparatus for mesh compression of mesh sequences with multiple texture maps per frame is provided. The apparatus may include at least one memory configured to store program code; and at least one processor configured to read the program code and operate as instructed by the program code. The program code may include first receiving code configured to cause the at least one processor to receive an input dynamic mesh representing a volumetric data of at least one three-dimensional (3D) visual content, wherein the input dynamic mesh comprises a plurality of mesh frames; first determining code configured to cause the at least one processor to determine that a mesh frame among the plurality of mesh frames comprises a plurality of texture maps in response to a mesh file associated with the mesh frame indicating that at least two different materials are applied in the mesh frame; second determining code configured to cause the at least one processor to determine a material index associated with each triangle face in the mesh frame, wherein a respective material index indicates a texture to be applied to a respective triangle face; and first encoding code configured to cause the at least one processor to encode material indices associated with the mesh frame of the input dynamic mesh.

According to an embodiment, a non-transitory computer-readable medium storing instructions is provided. The instructions may include: one or more instructions that, when executed by one or more processors of a device for mesh coding, cause the one or more processors to receive an input dynamic mesh representing a volumetric data of at least one three-dimensional (3D) visual content, wherein the input dynamic mesh comprises a plurality of mesh frames; determine that a mesh frame among the plurality of mesh frames comprises a plurality of texture maps in response to a mesh file associated with the mesh frame indicating that at least two different materials are applied in the mesh frame; determine a material index associated with each triangle face in the mesh frame, wherein a respective material index indicates a texture to be applied to a respective triangle face; and encode material indices associated with the mesh frame of the input dynamic mesh.

BRIEF DESCRIPTION OF THE DRAWINGS

Further features, nature, and various advantages of the disclosed subject matter will be more apparent from the following detailed description and the accompanying drawings in which:

FIG. 4 is a schematic illustration of a simplified block diagram of processing performed on an input mesh, in accordance with embodiments of the present disclosure.

FIG. 5A illustrates an exemplary mesh with a plurality of textures, in accordance with embodiments of the present disclosure.

FIG. 5B illustrates an exemplary mesh file, in accordance with embodiments of the present disclosure.

FIG. 6 illustrates a combined texture map, in accordance with embodiments of the present disclosure.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
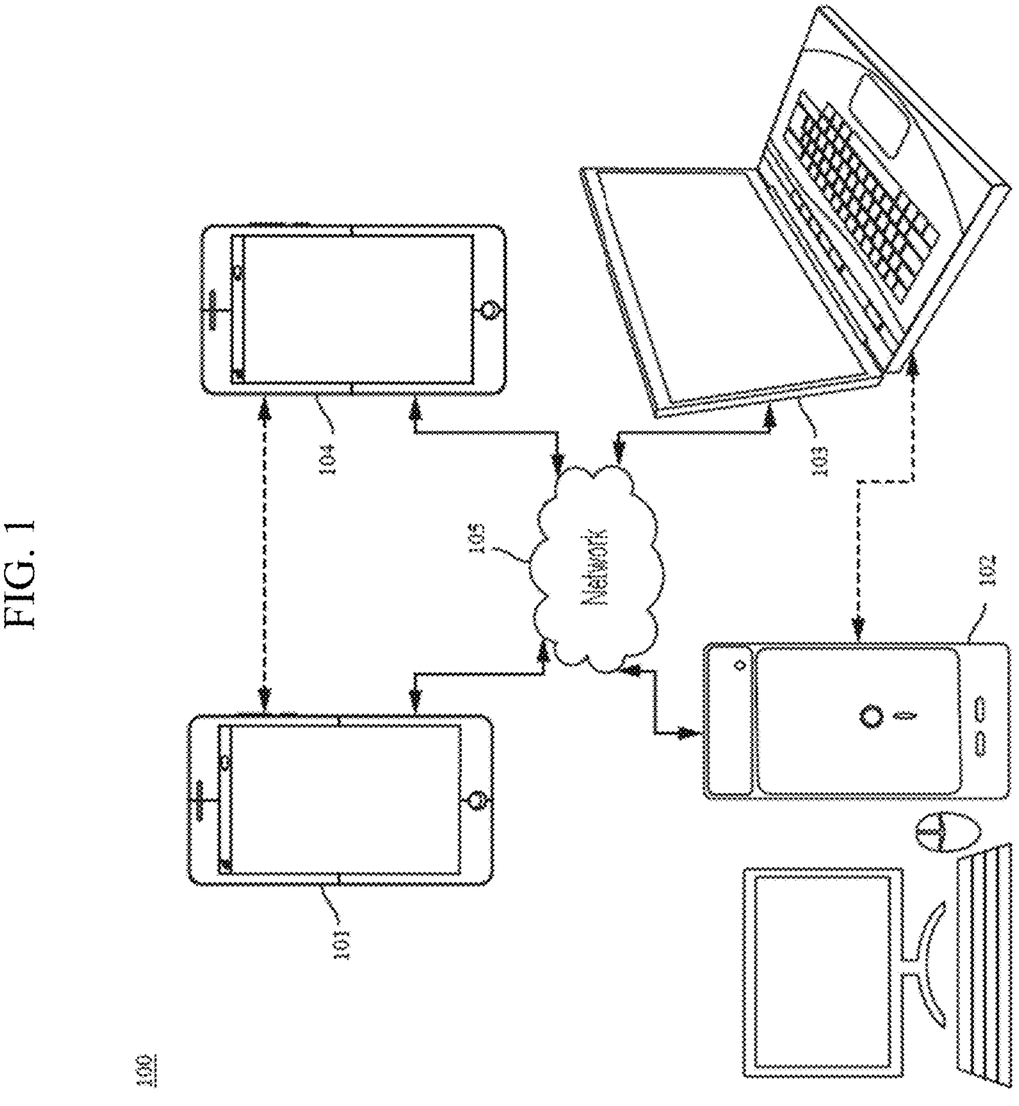
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
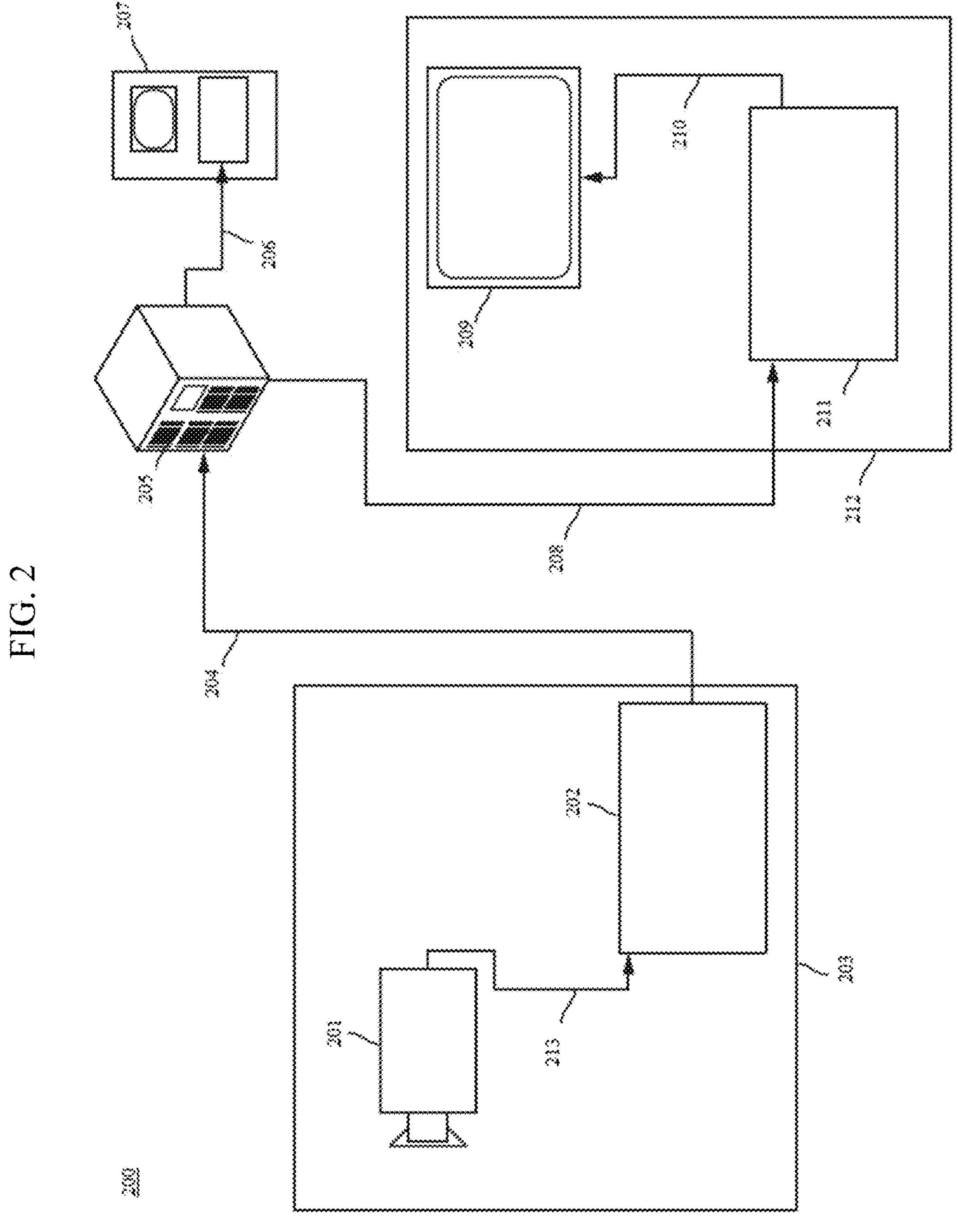
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

According to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 3:
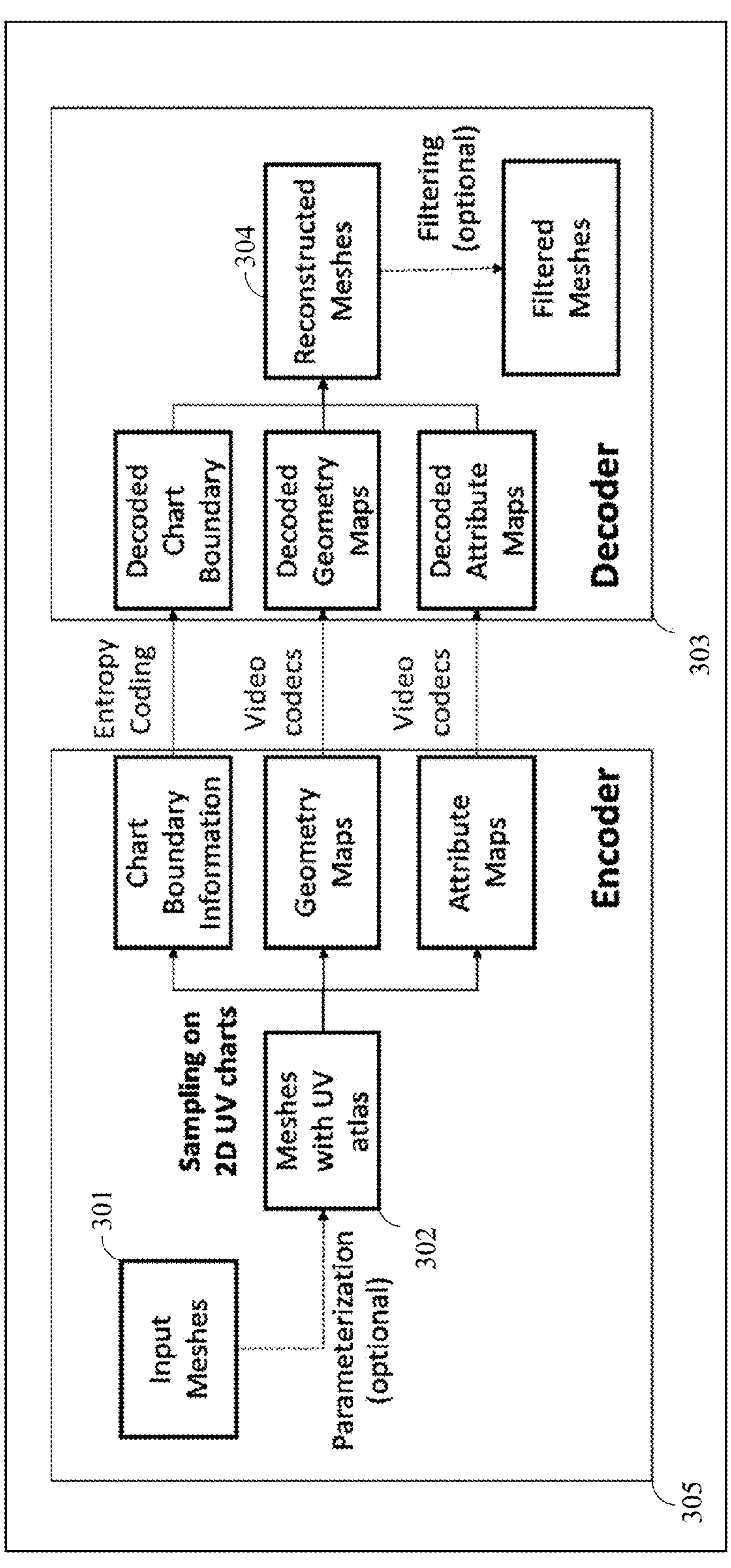
FIG. 3 is a schematic illustration of a simplified block diagram of a video encoder and decoder, in accordance with embodiments of the present disclosure.

FIG. 3 represents an example framework 300 of dynamic mesh compression such as for a 2D atlas sampling based method. Each frame of the input meshes 301 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 302, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 303 side, the meshes can be reconstructed from the decoded 2D maps. Any post-processing and filtering can also be applied on the reconstructed meshes 304. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information.

Dual Degree mesh coding is a specialized technique aimed at efficiently encoding and decoding the connectivity of polygon meshes. Through the principle of duality, dual degree mesh coding enables encoding and decoding connectivity data of sub-meshes by constructing two separate sequences: one characterizing the valence of vertices and the other depicting the degrees of faces.

In accordance with a standard in the art, a mesh consists of the following components: connectivity information; geometry information; mapping information; vertex attributes; and attribute maps.

Connectivity information is a set of vertex indices describing how to connect the mesh vertices to create a 3D surface. Geometry and all the attributes share the same unique connectivity information.

Geometry information is described by a set of 3D positions associated with the mesh vertices. The (x,y,z) coordinates describing the positions should have finite precision and dynamic range.

Mapping information describes how to map the mesh surface to 2D regions of the plane. Such mapping is described by a set of UV parametric/texture coordinates associated with the mesh vertices together with the connectivity information. The texture coordinates have finite precision and dynamic range.

Vertex attributes are scalar or vector attribute values associated with the mesh vertices. The attributes values have finite precision and dynamic range.

Attribute maps are attributes associated with the mesh surface and stored as 2D images/videos. The mapping between the videos (i.e., parametric space) and the surface is defined by the mapping information.

A dynamic mesh is a mesh where at least one of the five components is varying in time. An animated mesh is a dynamic mesh with constant connectivity.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

FIG. 4 illustrates a mesh encoding process 400.

It should be noted that, in encoding process 400 and throughout this disclosure, Attribute map A(i) may also be referred to texture map. As shown in FIG. 400, the input texture map needs to be modified if the geometry of the mesh is modified due to decimation in a pre-processing of the encoding process. The modification of the input texture map is called attribute transfer in FIG. 4. Similarly, attribute transfer may also be referred to as texture transfer in this disclosure.

Mesh sequences, such as those used in MPEG V-Mesh common test conditions, only have one texture map for each mesh frame. The MPEG V-Mesh codec, in related art, can only handle input mesh sequence with one texture map per frame.

Figure 5A:
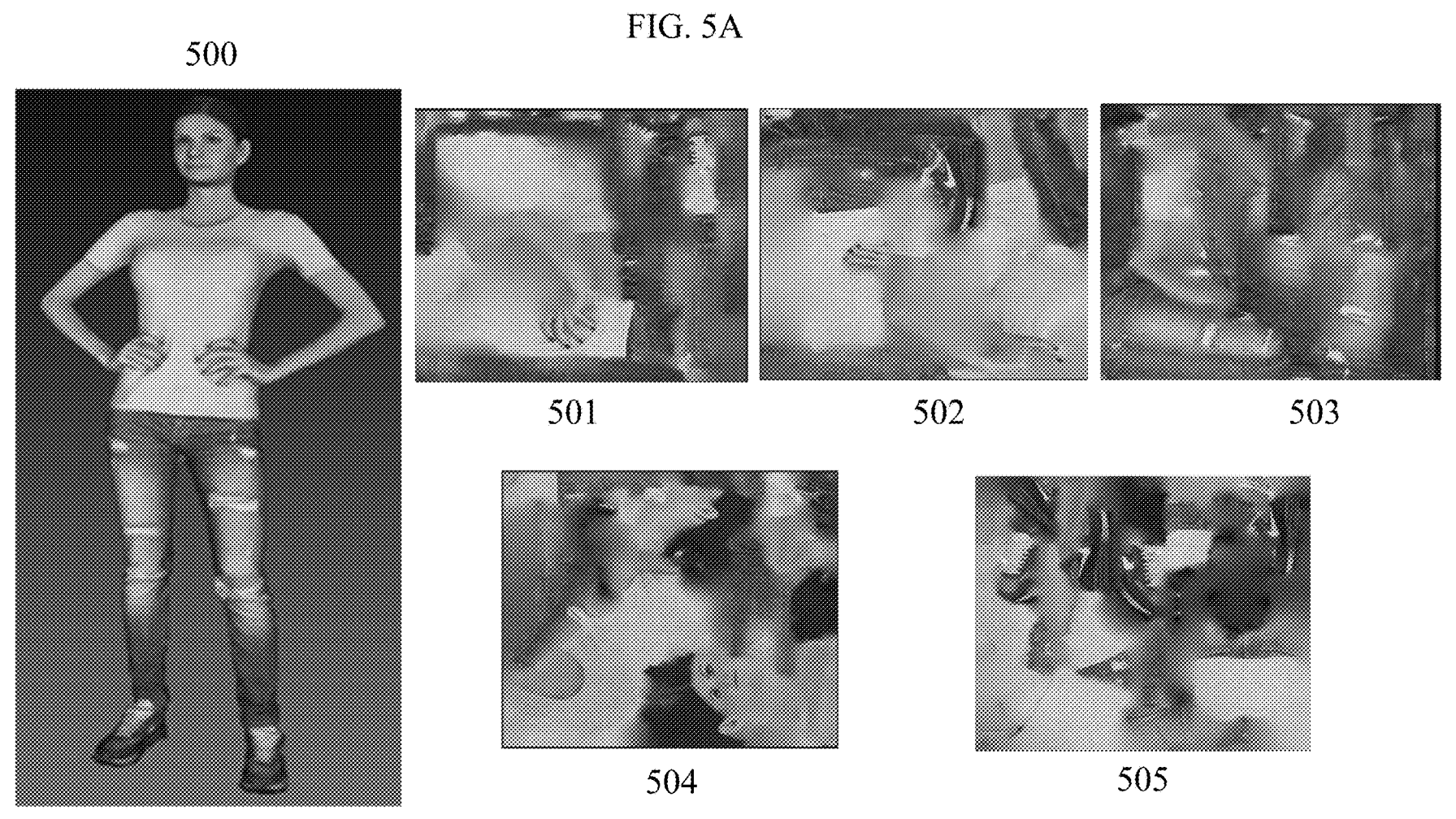

However, in practice, most mesh sequences include multiple texture maps per frame. For example, as shown in FIG. 5A, mesh frame 500 utilizes five texture maps—texture map 501, texture map 502, texture map 503, texture map 504, and texture map 505. It should be understood that the use of a five texture maps is merely exemplary and that a mesh frame may be any number of texture maps.

Generally, mesh file format, e.g., a wavefront.obj format, uses keywords to indicate that a new material is applied to a mesh frame. As an example, in FIG. 5B, in an object file 550, "usemtl" keyword is used to specify that a new material is applied to the following faces until a new "usemtl" keyword appears in the file. It should be known that a face can be a triangle, quadrilateral, hexagon, or polygon face. In embodiments, polygon faces may be converted to multiple triangle faces when reading an object file for purpose of mesh compression.

As shown in FIG. 5B, two materials, i.e., model1 and model2, are included, each corresponding to a texture map, e.g., model1.png and model2.png respectively. In embodiments, the material library file, i.e., "model.mtl", may contain the definition of the two materials including the corresponding texture map files and other information such as ambient light, specular light, etc. In addition, the texture coordinates of vertices of each face may be defined with respect to the corresponding texture map.

Embodiments of the present disclosure may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

It should be understood that the methods disclosed herein can be applied to not only dynamic meshes, but also static meshes, where there is only one frame of the mesh, or the mesh content does not change over time. Further, the disclosed methods and systems can be applied to any mesh compression standards, not limited to MPEG V-DMC standards.

Pre-Processing Approach

According to an embodiment, a pre-processing approach may be used to combine multiple texture maps into one large, combined texture map and to modify texture coordinates so that they are defined with respect to the combined texture map. FIG. 6 is an example of a combined texture map 600 of mesh frame 500.

As shown in FIG. 5A, the width and height of a texture maps 501-505 are the same, e.g., 1024. Thus, the width and height of the combined texture map in FIG. 6 are a combination, e.g., 3076 and 2048 respectively. As shown in FIG. 6, any unoccupied portion of the combined texture map may be padded with white pixels. In an embodiment, different types of padding pixels, e.g., grey pixels with RGB value all being 128, may be used. In another embodiment, any padding method that smooths the boundary between occupied and unoccupied regions, such as push-pull or sparse linear model-based approaches, may be applied so that compression of texture video can be more efficient.

As shown in FIG. 6, the texture maps are closely packed together. In another embodiment, guard space may be inserted between different texture maps. In addition, different texture maps may have different resolutions. They may be closely packed together or packed with guard space.

In another embodiment, a mesh with multiple texture maps can be re-parameterized such that the resulting texture map is a single image. By utilizing a mesh parameterization algorithm such as iso-charts, a texture atlas, which is a non-overlapping map of a 2D texture onto the mesh, is generated, along with a single texture map.

Mesh Compression with Material Index

According to an embodiment, a material index may be associated with each triangle face in a mesh frame. The material index may be assigned based on the order each material appears in an obj file. For example, the index of the material "mode1" and "model 2" in FIG. 5B are assigned as 0 and 1 respectively. In another embodiment, the material index may be assigned based on the order each material appears in the material library file, e.g., "model.mtl" in FIG. 5B. In yet another embodiment, the material index can be assigned arbitrarily as long as different material has a unique material index.

In mesh compression algorithm, connectivity is first compressed while traversing all triangles in a mesh followed by compression of vertex geometry coordinates and texture coordinates through prediction schemes.

In one embodiment, material indices of all triangle faces are compressed following the same traversal order as that used in the compression of texture coordinates.

If a triangle is coded first, its material index may be coded directly. Otherwise, a predictor, i.e., the material index of the last coded triangle, may be subtracted from the material index of the current triangle to form a material index difference which is coded in the bitstream. In embodiments, the material index or material index difference can be encoded using entropy code such as asymmetry numeral system (ANS) code or may be first binarized using a binarization scheme such as exponential Golomb code and coded using binary arithmetic code with or without context modeling.

In another embodiment, the material index of each triangle may be encoded directly without subtracting a predictor. The material index may be encoded using entropy code such as asymmetry numeral system (ANS) code or it can be first binarized using a binarization scheme such as exponential Golomb code and coded using binary arithmetic code with or without context modeling.

In another embodiment, the material index may be represented by the occupancy map. For an un-occupied pixel, its occupancy map value may be zero; for an occupied pixel, its occupancy map value may be the material index value. If the material index value starts from 0, then one could use (material index value+1), as the occupancy map value. The occupancy map can be compressed by a sequence encoder, such as ANS, or an image codec.

Mesh Compression with Re-Parameterization

Re-parameterization of a mesh is used as a pre-processing method to better represent a mesh content with a different set of vertices and associated texture information. It is sometimes used in decimation, which aims to reduce the number of vertices in a mesh object. For example, when decimation is applied in a mesh compression process, texture re-parameterization is adopted to generate new texture coordinates using the decimated mesh as an input. During texture re-parameterization process, multiple charts are generated, each chart corresponding to a patch of a mesh object.

In one embodiment all charts may be packed into a texture map with pre-defined configuration such as resolution, guard space, etc., in texture re-parameterization, such as iso chart-based method. Texture transfer method, such as mesh-based or point-cloud based method, may be utilized to transfer multiple texture maps into one texture map based on texture coordinates generated in the texture re-parameterization process. Since only one texture map is generated, there is no need to code material indices.

In another embodiment, all charts may be grouped into multiple groups. Charts in each group may be packed into a texture map based on a pre-defined configuration such as resolution, guard space, etc., in texture re-parameterization, such as iso chart-based method. Similarly, texture transfer method may be used to generate multiple texture maps based on texture coordinates generated in the texture re-parameterization process. Accordingly, multiple texture maps may be generated, each assigned with a unique material index. Each triangle in the decimated mesh may be associated with its corresponding material index. The material indices of all triangles can be coded using the approach similar to ones disclosed above for mesh compression of a material index.

Figure 7:
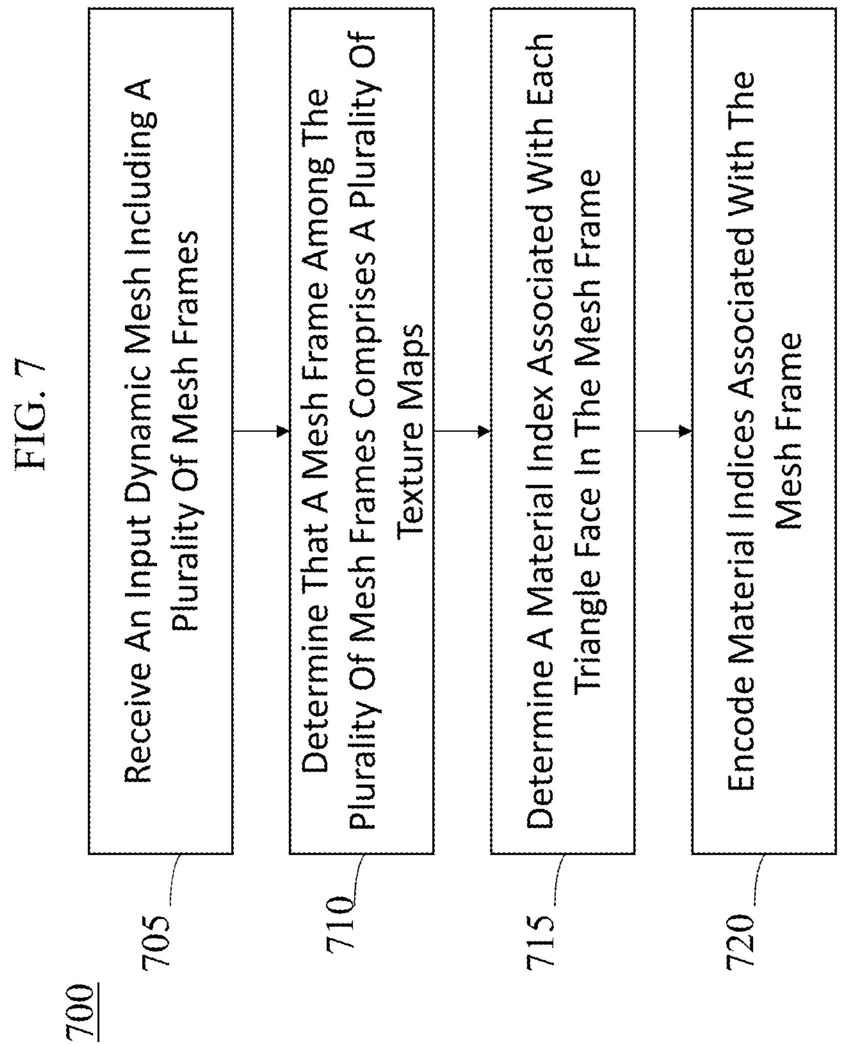
FIG. 7 is a flowchart of a process for mesh compression, in accordance with embodiments of the present disclosure.

FIG. 7 illustrates a mesh compression process 700 for mesh compression.

Operation 705 may include receiving an input dynamic mesh representing a volumetric data of at least one three-dimensional (3D) visual content, wherein the input dynamic mesh comprises a plurality of mesh frames.

Operation 710 may include determining that a mesh frame among the plurality of mesh frames comprises a plurality of texture maps in response to a mesh file associated with the mesh frame indicating that at least two different materials are applied in the mesh frame. In embodiments, determining that the at least two different materials are applied in the mesh frame may include determining that a parameter indicating a new material is applied in the mesh frame occurs at least twice. As an example, parameters discussed with reference to FIG. 5B.

Operation 715 may include determining a material index associated with each triangle face in the mesh frame, wherein a respective material index indicates a texture to be applied to a respective triangle face.

In embodiments, the material index is determined in accordance with an order in which each material of the at least two different materials appears in the mesh file. In embodiments, the material index is determined arbitrarily, and wherein each material among the at least two different materials has a different material index.

Operation 720 may include encoding material indices associated with the mesh frame of the input dynamic mesh. The encoding may include encoding the material indices associated with the mesh frame in a traversal order used for compression of texture coordinates associated with the mesh frame. The encoding may include encoding the material indices associated with the mesh frame as an occupancy map associated with a plurality of vertices of the mesh frame In embodiments, for a triangle face in the mesh frame that is encoded first, the encoding of the material indices may include encoding a first material index associated with the triangle face in the mesh frame that is encoded first. For remaining triangle faces, the encoding of the material indices may include encoding a respective material index predictor associated with a respective remaining triangle face where the respective material index predictor is a difference between a current material index of a current triangle face and a previous material index of a previous triangle face.

It may be understood that the process 700 may describe an encoding process, but a person of skill in the art will know that similar operations may be performed in a modified order for a decoding process.

The proposed methods may be used separately or combined in any order. The proposed methods may be used for arbitrary polygon mesh, but even though only a triangle mesh may have been used for demonstration of various embodiments. As noted above, it will be assumed that an input mesh may contain one or multiple instances, that a sub-mesh is a part of input mesh with an instance or multiple instances, and that multiple instances can be grouped to form a sub-mesh.

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
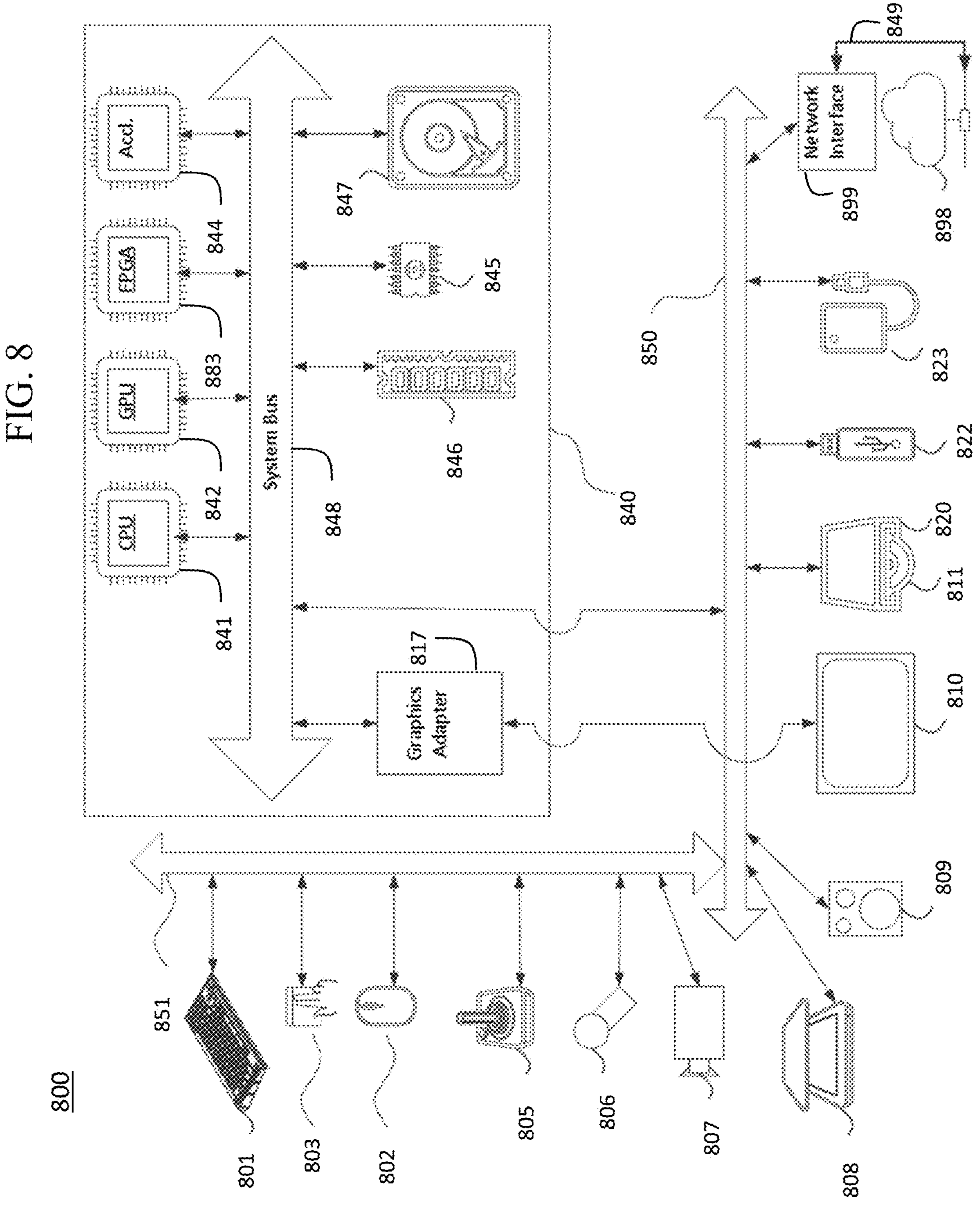
FIG. 8 is an exemplary diagram of a computer system suitable for implementing embodiments.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (750 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, the method being executed by at least one processor, the method comprising:

receiving an input dynamic mesh representing a volumetric data of at least one three-dimensional (3D) visual content, wherein the input dynamic mesh comprises a plurality of mesh frames;

determining that a mesh frame among the plurality of mesh frames comprises a plurality of texture maps in response to a mesh file associated with the mesh frame indicating that at least two different materials are applied in the mesh frame;

determining a material index associated with each triangle face in the mesh frame, wherein a respective material index indicates a texture to be applied to a respective triangle face; and decoding material indices associated with the mesh frame of the input dynamic mesh of which for a triangle face in the mesh frame that is decoded first, the decoding of the material indices comprises decoding a first material index associated with the triangle face in the mesh frame that is decoded first; and for remaining triangle faces, the decoding of the material indices comprises decoding a respective material index predictor associated with a respective remaining triangle face, and the respective material index predictor is a difference between a current material index of a current triangle face and a previous material index of a previous triangle face.

2. The method of claim 1, wherein the material index is determined in accordance with an order in which each material of the at least two different materials appears in the mesh file.

3. The method of claim 1, wherein the material index is determined arbitrarily, and wherein each material among the at least two different materials has a different material index.

4. The method of claim 1, wherein the decoding of the material indices comprises:

decoding the material indices associated with the mesh frame in a traversal order used for compression of texture coordinates associated with the mesh frame.

5. The method of claim 1, wherein the decoding the material indices associated with the mesh frame comprises:

decoding the material indices associated with the mesh frame as an occupancy map associated with a plurality of vertices of the mesh frame.

6. The method of claim 1, wherein the determining that the at least two different materials are applied in the mesh frame comprises:

determining that a parameter indicating a new material is applied in the mesh frame occurs at least twice.

7. A method for video encoding, the method being executed by at least one processor, the method comprising:

receiving an input dynamic mesh representing a volumetric data of at least one three-dimensional (3D) visual content, wherein the input dynamic mesh comprises a plurality of mesh frames;

determining that a mesh frame among the plurality of mesh frames comprises a plurality of texture maps in response to a mesh file associated with the mesh frame indicating that at least two different materials are applied in the mesh frame;

determining a material index associated with each triangle face in the mesh frame, wherein a respective material index indicates a texture to be applied to a respective triangle face; and encoding material indices associated with the mesh frame of the input dynamic mesh of which for a triangle face in the mesh frame that is encoded first, the encoding of the material indices comprises encoding a first material index associated with the triangle face in the mesh frame that is encoded first; and for remaining triangle faces, the encoding of the material indices comprises encoding a respective material index predictor associated with a respective remaining triangle face, and the respective material index predictor is a difference between a current material index of a current triangle face and a previous material index of a previous triangle face.

8. The method of claim 7, wherein the material index is determined in accordance with an order in which each material of the at least two different materials appears in the mesh file.

9. The method of claim 7, wherein the material index is determined arbitrarily, and wherein each material among the at least two different materials has a different material index.

10. The method of claim 7, wherein the encoding of the material indices comprises:

encoding the material indices associated with the mesh frame in a traversal order used for compression of texture coordinates associated with the mesh frame.

11. The method of claim 7, wherein the encoding the material indices associated with the mesh frame comprises:

encoding the material indices associated with the mesh frame as an occupancy map associated with a plurality of vertices of the mesh frame.

12. The method of claim 7, wherein the determining that the at least two different materials are applied in the mesh frame comprises:

determining that a parameter indicating a new material is applied in the mesh frame occurs at least twice.

13. A non-transitory computer-readable storage medium storing instructions and a video bitstream that is generated by a video encoding method, the instructions, when executed by a computer, cause the computer to implement the video encoding method comprising:

receiving an input dynamic mesh representing a volumetric data of at least one three-dimensional (3D) visual content, wherein the input dynamic mesh comprises a plurality of mesh frames;

determining that a mesh frame among the plurality of mesh frames comprises a plurality of texture maps in response to a mesh file associated with the mesh frame indicating that at least two different materials are applied in the mesh frame;

determining a material index associated with each triangle face in the mesh frame, wherein a respective material index indicates a texture to be applied to a respective triangle face;

encoding material indices associated with the mesh frame of the input dynamic mesh of which for a triangle face in the mesh frame that is encoded first, the encoding of the material indices comprises encoding a first material index associated with the triangle face in the mesh frame that is encoded first; and for remaining triangle faces, the encoding of the material indices comprises encoding a respective material index predictor associated with a respective remaining triangle face, and the respective material index predictor is a difference between a current material index of a current triangle face and a previous material index of a previous triangle face; and transmitting the video bitstream.

14. The non-transitory computer-readable storage medium of claim 13, wherein the material index is determined in accordance with an order in which each material of the at least two different materials appears in the mesh file.

15. The non-transitory computer-readable storage medium of claim 13, wherein the material index is determined arbitrarily, and wherein each material among the at least two different materials has a different material index.

16. The non-transitory computer-readable storage medium of claim 13, wherein the encoding of the material indices comprises:

encoding the material indices associated with the mesh frame in a traversal order used for compression of texture coordinates associated with the mesh frame.

17. The non-transitory computer-readable storage medium of claim 13, wherein the encoding the material indices associated with the mesh frame comprises:

encoding the material indices associated with the mesh frame as an occupancy map associated with a plurality of vertices of the mesh frame.

18. The non-transitory computer-readable storage medium of claim 13, wherein the determining that the at least two different materials are applied in the mesh frame comprises:

determining that a parameter indicating a new material is applied in the mesh frame occurs at least twice.

* * * * *